April 20, 1926.
E. T. FERNGREN
1,581,922
GLASS FEEDER
Filed Jan. 28, 1924
3 Sheets-Sheet 1
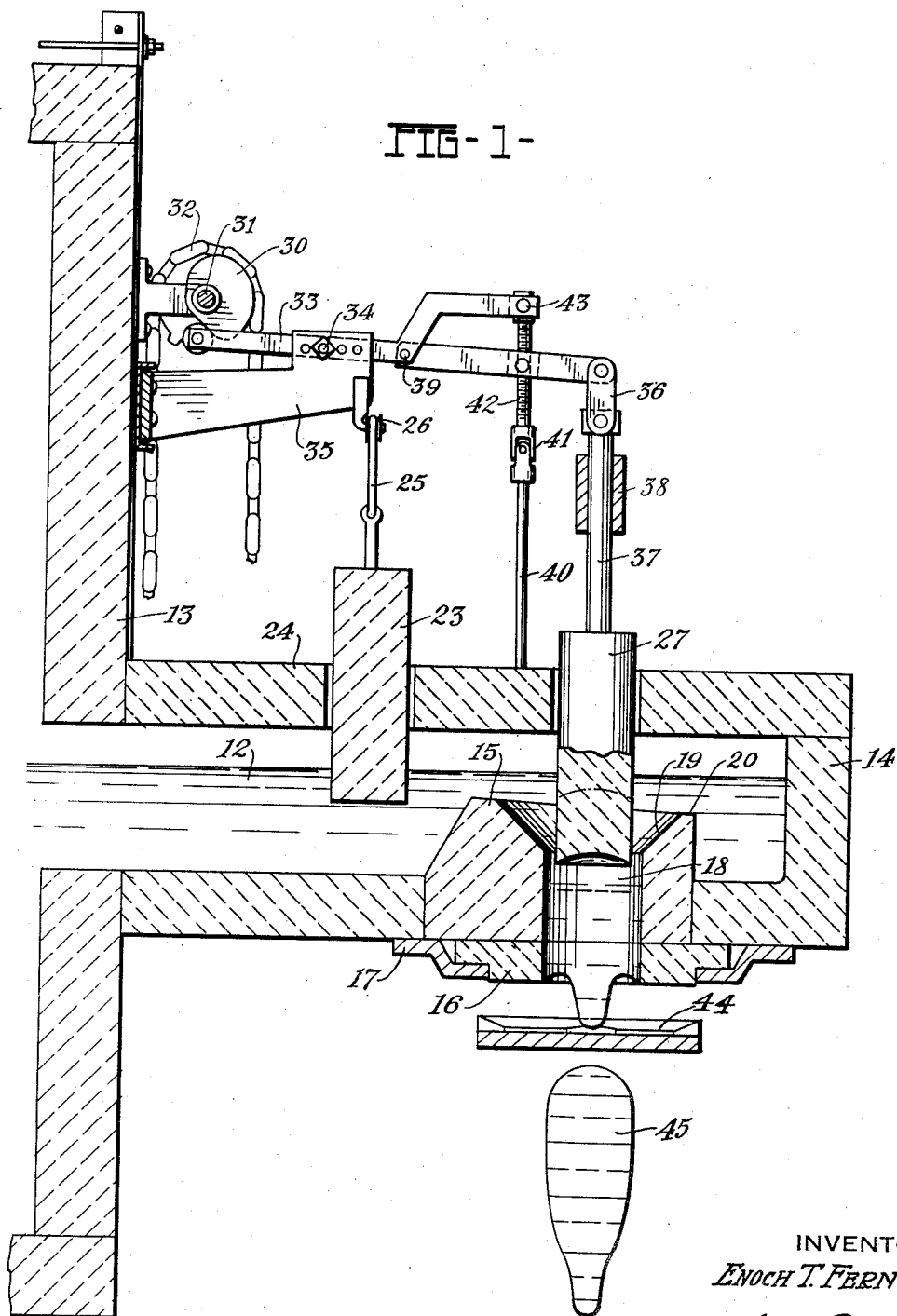
FIG-1-
INVENTOR
*Enoch T. Ferngren*
By *J. F. Rule*
HIS ATTORNEY.

April 20, 1926. 1,581,922
E. T. FERNGREN
GLASS FEEDER
Filed Jan. 28, 1924 3 Sheets-Sheet 2
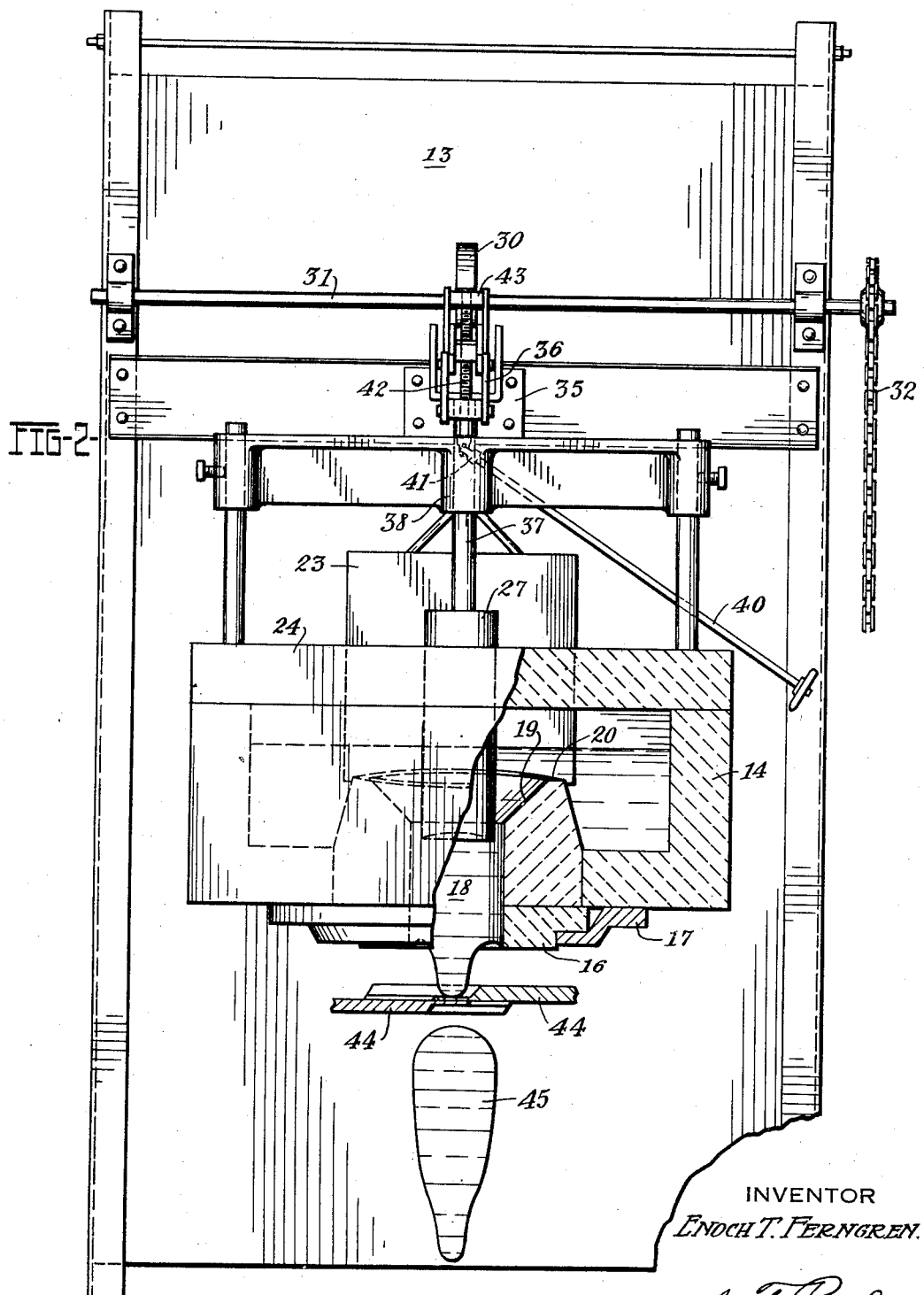
INVENTOR
ENOCH T. FERNGREN.
BY J. F. Rule
HIS ATTORNEY.

April 20, 1926.
E. T. FERNGREN
GLASS FEEDER
Filed Jan. 28, 1924
1,581,922
3 Sheets-Sheet 3
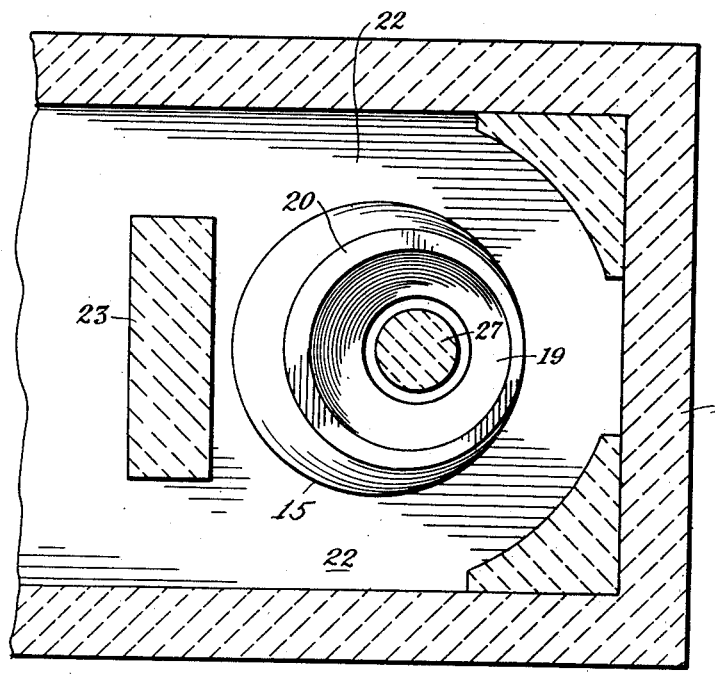
FIG-3-
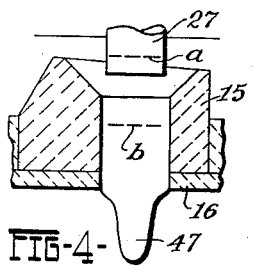
FIG-4-
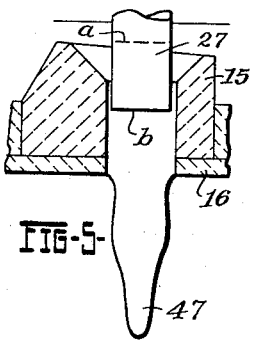
FIG-5-
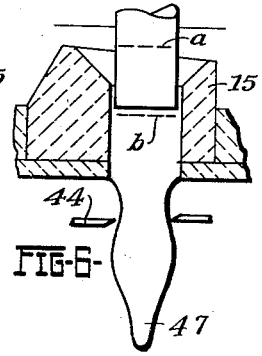
FIG-6-
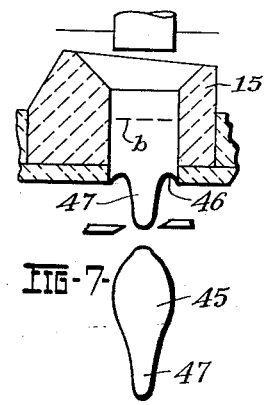
FIG-7-
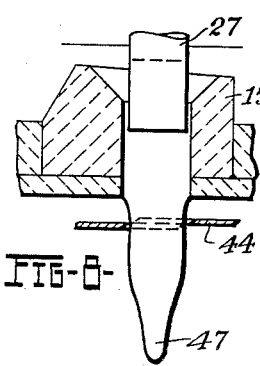
FIG-8-
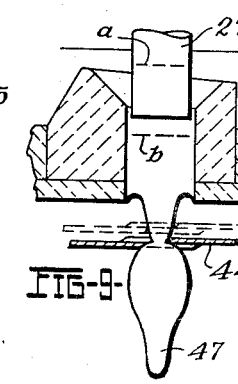
FIG-9-
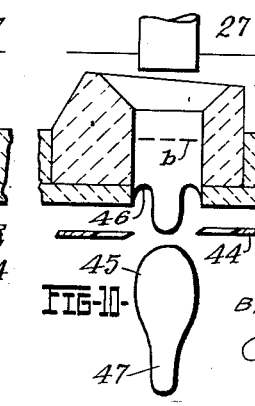
FIG-10-
INVENTOR
ENOCH T. FERNGREN
By J. F. Rule
HIS ATTORNEY.

Patented Apr. 20, 1926.

1,581,922

UNITED STATES PATENT OFFICE.

ENOCH T. FERNGREN, OF TOLEDO, OHIO, ASSIGNOR TO THE OWENS BOTTLE COMPANY, OF TOLEDO, OHIO, A CORPORATION OF OHIO.

GLASS FEEDER.

Application filed January 28, 1924. Serial No. 689,021.

*To all whom it may concern:*

Be it known that I, ENOCH T. FERNGREN, a citizen of the United States, residing at Toledo, in the county of Lucas and State of Ohio, have invented new and useful Improvements in Glass Feeders, of which the following is a specification.

My invention relates to glass feeding apparatus for the production of individual masses or charges of glass adapted to enter the molds of a glass forming machine. The invention relates more particularly to that type of feeders in which the discharge of glass through an outlet in the bottom of a container is controlled by a vertically reciprocating plug or regulator which also controls the shape of the suspended gobs of glass issuing from the outlet.

In feeders now in use of the type above indicated, difficulty has been experienced on account of an uneven or one-sided flow of the glass through the usual outlet, owing to the tendency of the glass to establish a channel leading to the edge of the outlet nearest the furnace from which the glass is supplied, so that the glass at the side of the outlet more remote from the furnace becomes comparatively cold and sluggish, resulting in an uneven flow and producing charges or gobs colder on one side than the other, or which contain cold streaks and which, moreover, are more or less distorted or unsymmetrical in shape. This lack of symmetry and unevenness of temperature and consistency, result in corresponding defects in the finished ware.

A further defect in the charges of glass produced by feeders of the type indicated is caused by impurities in the glass which is ordinarily drawn from the lower strata of glass in the feeder. This glass as it feeds toward the discharge opening, contacts with the refractory walls of the container and by its abrasive action introduces impurities into the glass and also produces more or less of an alumina of glass flux. This further tends to exert a drag upon the glass flowing over one side or edge of the orifice, causing the extruded suspended gob to become warped in one direction or another.

An object of the present invention is to provide an improved and practical form of glass feeding apparatus which will avoid the above objections and produce formed charges of glass symmetrical in shape, temperature and consistency. A further object of the invention is to provide improved means for controlling the shape of the suspended charges of glass and particularly for producing a charge having its lower end tapered to fit certain forms of molds for making narrow neck ware.

The invention in its preferred form comprises a container from which the glass is discharged through an outlet opening in the bottom of a well, the walls of which project upward above the floor of the container so that the issuing glass is drawn from a level near the upper surface of the glass in the container. The glass entering the well is thus practically free from contamination or foreign substances extracted from the refractory walls of the furnace or container. The upper surface or rim of the well is inclined or so arranged that the inflow of glass thereto is promoted from the side sections and particularly from the glass in the closed end of the boot. Also the thickness of the walls of the well and their surface area and angular exposure beneath the glass flow as they are positioned relative thereto and as they are related to the maximum and minimum degrees of heat contained and the glass mobility retained at the opened or the closed end of the boot, are causative to beget and maintain the same fluidity, volume movement, and pressure of the glass at all points along the inner periphery of the well, this being conducive to symmetry of shape, uniform surface viscosity, like consistency and temperature conditions in the issuing glass.

Other features of the invention will appear hereinafter.

In the accompanying drawings:

Figure 1 is a sectional side elevation of an apparatus constructed in accordance with my invention.

Figure 2 is a part sectional front elevation of the same.

Figure 3 is a sectional plan view.

Figures 4 to 10 are diagrammatic views illustrating successive steps in the formation of charges. Figures 4 to 7 illustrate successive steps in a cycle of the plunger movements during the formation of a gob. Figures 8 to 10 illustrate successive steps with a different adjustment of the plunger, resulting in a different form of gob.

Molten glass 12 may be continuously supplied from the furnace 13 to the container 14 which may be the usual furnace boot or extension. Within the receptacle 14 is a clay bushing or member 15 which is fitted in an opening in the floor of the boot. Beneath the member 15 is a clay bushing or ring 16 forming a support for the member 15, the bushing 16 being held in position by a metal supporting ring 17. A cylindrical opening 18 extends through the parts 15, 16, so that there is provided a well into which the glass flows from the boot, the glass being discharged through the lower open end of the well. The upper portion of the well is formed with upwardly and outwardly inclined or flared walls 19 terminating at the upper surface or rim 20. The plane of the rim 20 is downwardly and forwardly inclined so that the front portion of the rim is somewhat lower than the rear portion. The purpose of this arrangement is to counteract or neutralize the tendency of the glass to enter the well mainly at the rear side, that is, the side nearest the furnace. By having the front edge of the well lower than the rear edge, the proportion of the glass which flows through the side channels 22 (Fig. 3) between the walls of the boot and the member 15 to the front of the well, is increased, so that the inflow of glass into the well is substantially equally distributed around the rim of the well. The wall of the well on the side nearest the furnace being thicker than at the side of the well remote from the furnace, permits a relatively small amount of heat to be conducted through the thick wall, thus tending to equalize the temperature of the inner surface wall of the well.

A further means of equalizing and directing the flow comprises an adjustable wall or gate 23 which extends downward through an opening in the cover plate 24 of the boot and projects downward into the glass behind the well, and thus forms an obstruction which reduces or impedes the flow of glass directly from the furnace to the adjacent edge of the well. The gate 23 is supported by a cable 25 running over a sheave 26 and provided with any suitable means for adjusting the gate up and down. By lowering or raising the gate, a greater or less amount of glass may be deflected and directed into the channels 22 and as positioned, the gate directs the powerful radiant heat of the furnace over the channels 22 toward the closed end of the boot while shielding the rear portion of the well from excessive heating. The discharge of glass from the well 18 is regulated and controlled by a cylindrical plunger or regulating plug 27 which extends downward through an opening in the cover plate 24 and into the well 18. The diameter of the plunger is substantially less than that of the well to permit the plunger to work freely up and down through the glass in the well, but large enough to effectively control the issuing glass. The lower end of the plunger is preferably square or concave, as shown in Figure 1, which shape is better adapted for imparting to the gob of glass the particular conformation herein shown, than the usual tapered or pointed plunger.

The plunger is periodically reciprocated vertically by an operating cam 30 secured to a shaft 31 which is driven continuously by a sprocket wheel and chain 32. The cam 30 actuates a lever 33 fulcrumed at 34 on a stationary bracket 35. The forward end of the lever is connected through a link 36 to the stem 37 of the plunger, said stem being guided in a stationary bearing sleeve 38. The lever 33 may be made in sections connected by a pivot 39. Said sections are relatively adjustable about the pivot 39 by means of a hand operated adjusting rod 40 connected through a universal joint 41 to a rod 42 having a screw threaded connection with one section of the lever and a pivotal connection 43 with the other section. By rotating the hand rod 40, the plunger may be adjusted up or down. A pair of cutter blades 44 are periodically operated in synchronism with the movements of the plunger to sever the suspended gobs 45.

The operation of the plunger in controlling the formation of a gob will be understood by reference to Figures 4 to 7 which illustrate successive steps in the formation of the gob. As indicated in Figure 4, the plunger 27 has commenced its movement downward from its uppermost position indicated by the broken line a. The glass at this time has commenced its downward movement under the influence of gravity. As the plunger continues its downward movement from the Figure 4 position, it exerts an expelling force on the glass, thereby augmenting the action of gravity on the glass. This expelling force is increased and becomes more positive as the lower end of the plunger enters the cylindrical portion of the well. This positive expelling action continues until the plunger is at its lowermost position about as shown in Figure 5, or at a lower point, at which time sufficient glass has been extruded to form the complete gob which is suspended from the walls of the outlet orifice. The plunger commences its upward movement from its lowermost position b, preferably before the cutters operate to grip the exterior of the glass discharge and to sever the gob. This upward movement causes a restriction or necking-in of the glass at about the plane of the cutters which operate with a suitably coordinated speed and movement to grip in on the glass and to progressively reduce its cross section and give a downward taper to the previously necked-in section toward the gripping point about the time the plunger reaches the Figure 6 position, that is, just after it has commenced its upward movement. The gripping-in movement of the cutters may be caused to terminate for a fleeting instant after their edges have penetrated a suitable distance towards the center of the glass discharge and prior to the completed severance of the gob, as the upward pull or suction of the plunger on the glass above the plane of operation of the cutters attains its maximum power, to thereby limit the retractive stretching and attenuating action on the previously expelled glass to that portion thereof which is above the cutting plane and to thereby also give a finer point and a more neck-like taper to the lower end of each succeeding gob. As the plunger continues to move upward after the glass has been severed, it exerts a retractive pull on the glass which is most effective adjacent the walls of the well, causing the glass to be drawn upward at 46, leaving a more or less pointed central projecting tip of glass 47 which forms the lower end of the next succeeding gob. After the plunger has reached its uppermost position, a flow of glass is reestablished and the cycle of operations repeated.

Figures 8 to 10 illustrate a somewhat modified operation. The cutters 44 in this instance are in a higher plane, closer to the outlet. During the cutting stroke the shears move downward from the dotted line position (Fig. 9) to the full line position. This downward movement of the shears modifies the shape of the upper end of the gob which is less pointed or more nearly square, as shown in Figure 10, than when there is no downward movement of the shears.

Another form of operation for the production of a more extended or narrow or more stem-like taper on the lump of glass, or the formation of a long tapering mold charge, consists in moving the shears or cutting means downwardly for a longer distance toward some predetermined point while they are partly open, and gripping a thereby suitably reduced section of the glass, and to follow this downward movement by a swift cutting action as it is arrested at any predetermined point, thereby imparting considerable stretching to the glass below the opening 18 as it is simultaneously acted upon by the elevating plunger and the descending gripping means, or cutters. Other means than the shears or cutting means might be employed for effecting the stretching and tapering of the glass in the manner above described.

Modifications may be resorted to within the spirit and scope of my invention.

What I claim is:

1. The combination of a container for molten glass, an annular member projecting upward from the floor of the container and providing an open bottomed well through which glass is discharged from the container, means for maintaining a supply of molten glass within the container with the level of the glass above the upper surface of said member, a plunger projecting downward into the well, and means to periodically reciprocate the plunger up and down.

2. A container for molten glass having an outlet opening in its bottom, an annular wall surrounding said opening and projecting upward above the floor of the container and forming a well comprising a cylindrical portion, the inner surface of the wall being upwardly and outwardly flared above the cylindrical portion, and means to cause an inflow of glass over the top of said wall into the well from all sides.

3. The combination with a container for molten glass having an outlet opening in the floor thereof, of an annular member surrounding said opening and projecting upward from the floor of the container, said member providing an open bottomed well through which glass is discharged from the container, said member being closed except at its top and bottom and having its upper surface beneath the surface of the glass in the container and inclined to the horizontal.

4. The combination of a furnace comprising a boot or extension into which glass flows from the furnace, said boot having an outlet opening in the bottom thereof, an annular member surrounding said outlet and projecting upward from the floor of the boot and providing a well into and through which the glass flows from the boot, said member having its upper edge below the level of the glass to permit the entrance of the glass to the well, said member preventing the entrance of glass to the well except over the top of said member, a regulating device projecting downward into the well, and means to periodically reciprocate said device.

5. The combination of a furnace comprising a boot or extension into which glass flows from the furnace, an annular member projecting upward from the floor of the boot and providing a well into and through which the glass flows from the boot, a regulating member projecting into the well, and means to periodically reciprocate said member, the upper surface or rim of said well being at a lower level in front of the regulator than at the rear thereof.

6. The combination of a furnace comprising a boot or extension into which glass flows from the furnace, an annular member projecting upward from the floor of the boot and providing a well into and through which the glass flows from the boot, a regulating member projecting into the well, and means to periodically reciprocate said member, the upper surface or rim of said annular member lying in a forwardly and downwardly inclined plane.

7. The combination of a furnace comprising a boot or extension into which glass flows from the furnace, an annular member projecting upward from the floor of the boot and providing a well into and through which the glass flows from the boot, and means within the glass between said member and the main part of the furnace to deflect the glass to the sides of said member.

8. The combination of a furnace comprising a boot or extension into which glass flows from the furnace, an annular member projecting upward from the floor of the boot and providing a well into and through which the glass flows from the boot, said member being closed except at the top and bottom whereby the glass can only enter the well from the top, a regulating member projecting into the well, means to periodically reciprocate said member, and means to cause a substantially uniform flow of glass into the well from all sides.

9. The combination of a furnace comprising an extension forming a container into which molten glass flows from the furnace, an annular wall in said container extending upward above the floor of the container and forming a well into and through which the glass flows, and a refractory member substantially equal in width to the external diameter of said wall, projecting downward into the glass between said well and the furnace and forming a deflector by which a direct flow of glass from the furnace to the adjacent side of the well is obstructed.

10. The combination of a container for molten glass, an open bottomed well within the container projecting upwardly above the floor of the container, means to supply a flow of glass into the container from one side thereof, and a deflector comprising a block of refractory material projecting downward into the glass between said well and the point at which the glass flows into the container, said deflector being of less width than the container and spaced from the side walls of the container and operable to divert the flow of glass into the channels or spaces between the well and the side walls of the container.

11. The combination of a container for molten glass having an outlet opening in the bottom thereof, a regulator in the glass above the outlet, means to periodically reciprocate the regulator up and down, a wall surrounding and spaced from the regulator and extending upward from the floor of the receptacle and terminating below the surface of the glass to provide a well, said well being closed except at its top and bottom whereby the glass is caused to enter the well by flowing over the top of said wall.

12. The combination of a container for molten glass having an outlet opening in the bottom thereof, a regulator in the glass above the outlet, means to periodically reciprocate the regulator up and down, and a wall surrounding and spaced from the regulator and extending upward from the floor of the receptacle and terminating below the surface of the glass, said wall forming a cylindrical well, the inner surfaces of the wall being upwardly and outwardly flared at the upper end of the cylindrical portion, thereby forming a funnel-shaped entrance to the well, said well being closed except at its top and bottom whereby the glass is caused to enter the well by flowing over the top of said wall.

13. The combination of a container for molten glass having an outlet opening in the bottom thereof, a regulating plunger in the glass above the outlet, a wall surrounding said outlet and extending upward above the floor of the container to form a cylindrical well into which said plunger projects, said well being closed except at its top and bottom whereby the glass is caused to enter the well by flowing over the top of said wall, said plunger comprising a substantially cylindrical body, the lower end of which is the full diameter of the plunger, and means to periodically reciprocate the plunger vertically.

14. The combination of a container for molten glass having an outlet opening in the bottom thereof, a regulating plunger in the glass above the outlet, a wall surrounding said outlet and extending upward above the floor of the container to form a cylindrical well into which said plunger projects, said well being closed except at its top and bottom whereby the glass is caused to enter the well by flowing over the top of said wall, said plunger comprising a substantially cylindrical body, the lower end of which is the full diameter of the plunger, and means to periodically reciprocate the plunger vertically, the lower end of said plunger when in its uppermost position being above the cylindrical portion of the well.

15. The method of giving a downward tapering form to gob mold charges which are discharged in succession from a supply through an orifice, which consists in periodically projecting a mass of molten glass from the orifice, in exerting a retractive pull from the orifice on each mass following its projection, in cutting in toward the center of the projected mass with cutting blades without complete severance and then checking the blades during a predetermined period of the retractive action on the mass to localize the effect of said action to that portion of said mass which is above the cutting blades and to thereby taper said portion from the orifice to the point of contact of the cutting blades, and then completing the cut to release the rear end of the preceding gob from the pointed forward end of the succeeding one.

16. The combination of a container for molten glass having an outlet opening in the bottom thereof, a regulator in the glass above the outlet, means to periodically reciprocate the regulator up and down, a wall surrounding and spaced from the regulator and extending upward from the floor of the container and terminating below the surface of the glass to provide a well, said well being closed except at its top and at said outlet opening, whereby the glass is caused to enter the well by flowing over the top, and means to supply molten glass to the container at one side of the well, the upper edge of said wall at said side being higher than at the opposite side.

17. The combination of a container for molten glass having an outlet opening in the bottom thereof, a regulator in the glass above the outlet, means to periodically reciprocate the regulator up and down, a wall surrounding and spaced from the regulator and extending upward from the floor of the container and terminating below the surface of the glass to provide a well said well being closed except at its top and at said outlet opening, whereby the glass is caused to enter the well by flowing over the top, and means to supply molten glass to the container at one side of the well, the upper edge of said wall being in a plane inclined downwardly away from said side.

Signed at Toledo, in the county of Lucas and State of Ohio, this 24th day of January, 1924.

ENOCH T. FERNGREN.